May 1, 1951

C. S. R. WALFORD 2,551,074

LOADING PLATFORM

Filed Aug. 1, 1947

Inventor:-
Clements S. R. Walford,
By:- Smith, Michael and Gardiner
Attorneys.

Patented May 1, 1951

2,551,074

UNITED STATES PATENT OFFICE 2,551,074

LOADING PLATFORM

Clements Samuel Robert Walford, Broomfield, near Chelmsford, England

Application August 1, 1947, Serial No. 765,518
In Great Britain June 17, 1946

Section 1, Public Law 690, August 8, 1946
Patent expires June 17, 1966

13 Claims. (Cl. 214—84)

This invention relates primarily to trucks designed for the carriage of goods, but it is also applicable to any platform onto which goods have to be loaded.

It is well known that it is difficult to manipulate heavy goods over the end of a truck or other raised platform when loading or unloading by hand, and the principal object of this invention is to provide means whereby this task is simplified.

Another object of this invention is to provide a unitary roller assembly which can readily be built into a truck to facilitate loading or unloading thereof.

In my invention, I form the edge over which the goods have to be passed as a roller or series of aligned rollers all of the same diameter.

My invention will be better understood from the following description of the preferred embodiment thereof when read with reference to the annexed drawings, in which.

Figure 1:
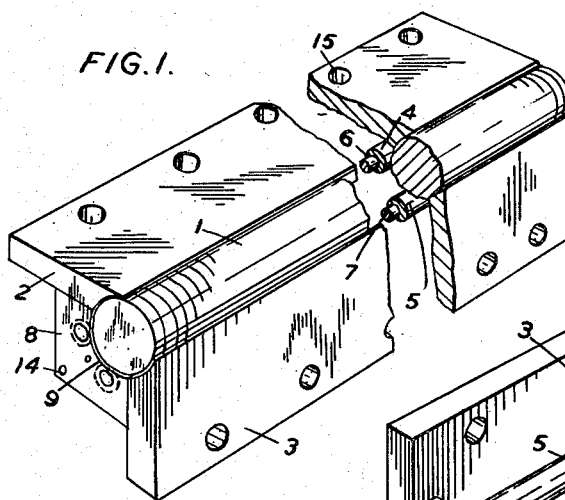
Figure 1 is a perspective view of a unitary assembly.
Figure 2:
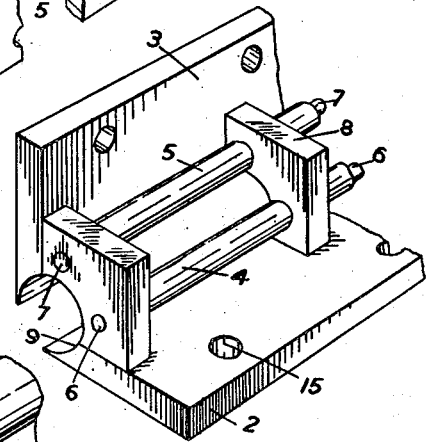
Figure 2 is a rear view of the same assembly inverted and with the main roller removed.
Figure 3:
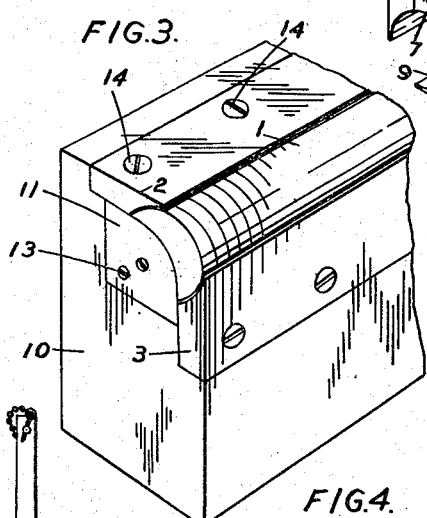
Figure 3 is a perspective view of the assembly fitted into a cross member at the end of a truck.
Figure 4:
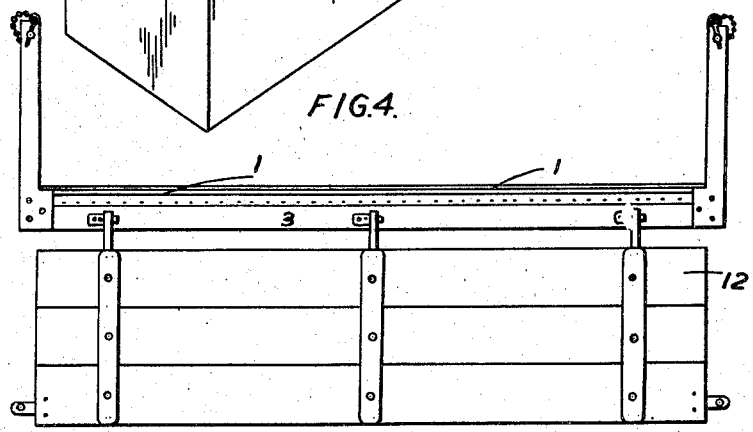
Figure 4 shows the end of a truck with my present invention applied thereto, this figure being on a much smaller scale than Figures 1 through 3.

The assembly consists of a steel roller 1 which is accommodated between two metal plates 2 and 3, disposed at right angles to one another with a gap between them, this gap being filled by the roller 1 as clearly shown in Figures 1 and 3. Each plate 2 and 3 is curved at its edge nearer the other plate so as to fit neatly round the roller 1, the horizontal surface of the plate 2 and the vertical surface of the plate 3 being tangential to said roller. The roller 1 rests freely on two parallel rows of short rollers 4 and 5 mounted, respectively, on spindles 6 and 7 which pass through transverse webs 8 which are welded to, and thus unite, the plates 2 and 3. Each web 8 is curved as shown at 9 so that the series of webs leave a space adapted to receive the roller 1. The assembly is fixed in a rebate formed at the corner of a wooden cross member 10, which is, in fact, the rear end member of the floor of a truck. The fixing is effected by screws 14 which pass through holes 15 in the plate 2 and by similar screws which pass through similar holes in plate 3. The roller 1 and the spindles 6 and 7 are held axially in position by end plates 11 fixed to the end webs 8 by screws 13 which enter holes 16 in the end webs 8. Figure 4 shows the rear end of the truck with an assembly in position thereon, and with a tailboard 12 of the usual kind hanging downwardly therefrom.

It will be seen that when the assembly is in position, the roller forms the corner between the horizontal surface presented by the floor of the truck and the vertical surface extending downwards from the end of said horizontal surface. In other words, the roller replaces the normal fixed sharp edge by a rotatable curved one. A roller provided in this way offers assistance when heavy goods are being loaded over the edge of any raised platform in direct contrast to the obstruction always presented by the normal fixed sharp edge.

The single roller 1 may be replaced by a series of aligned rollers all of the same diameter. Although such a roller or series of rollers is preferably arranged so that the top surface of the truck floor or other platform is tangential to it, the roller or rollers may protrude above the surface of the platform without detriment, provided that no substantial obstruction to the sliding of goods over the edge of the platform is presented. Likewise, although such a roller or series of rollers is preferably arranged so that the vertical end surface of the truck or other platform is tangential to the roller, the roller may project beyond this surface.

It will be appreciated that in the embodiment shown, the provision of the assembly in no way interferes with the operation of the tailboard, and that when the board is down, the roller 1, which forms the corner of the floor of the truck, is exposed, so that the loading or unloading of goods over the end of the truck onto the floor is much facilitated.

I claim:

1. A unitary assembly adapted to form the loading and unloading edge of a loading platform and comprising a roller, two metal plates disposed at right angles to one another to leave a gap of width less than the diameter of said roller, a plurality of transverse webs uniting said plates, roller bearing means carried by said webs, and a roller supported by said bearing means to lie in and close said gap.

2. A unitary assembly adapted to form the loading and unloading edge of a loading platform and comprising a roller, two metal plates disposed at right angles to one another to leave a gap of width less than the diameter of said roller, a plurality of transverse webs uniting said plates, a pair of spindles passing through said webs, a plurality of bearing rollers carried by said spindles, and a roller supported by said bearing rollers, said plates at the edges of said gap being tangential to said roller.

3. A unitary assembly adapted to form the loading and unloading edge of a loading platform, said assembly comprising roller means; and a housing for said roller means, said housing comprising two metal plates disposed at right angles to each other with their adjacent edges spaced apart to leave a gap therebetween of a width less than the diameter of said roller means, a plurality of spaced, transverse webs uniting said plates, and roller bearing means carried by said webs; said roller means projecting into said gap and being rotatably supported in said housing by said bearing means.

4. A unitary assembly adapted to form the loading and unloading edge of a loading platform, said assembly comprising roller means; and a housing for said roller means, said housing comprising two metal plates disposed at right angles to each other with their adjacent edges spaced apart to leave a gap therebetween of a width less than the diameter of said roller means, a plurality of spaced, transverse webs uniting said plates, a pair of spindles passing through said webs, and a plurality of bearing rollers rotatably mounted on said spindles; said roller means projecting into said gap and being rotatably supported in said housing by said bearing rollers.

5. A unitary assembly adapted to form the loading and unloading edge of a loading platform, said assembly comprising a roller and a housing for said roller, said housing comprising two metal plates disposed at right angles to each other with their adjacent edges spaced apart to leave a gap therebetween of a width less than the diameter of said roller, roller bearing means locating said roller between said plates with the surface of said roller lying in and closing said gap and effective in conjunction with said plates to provide complete radial support to said roller, and a pair of end plates operative to locate said roller in an axial direction.

6. A unitary assembly adapted to form the edge of a loading platform and comprising two plates, roller means, and roller bearing means, said two plates lying in planes at right angles to one another and defining a slot at the intersection of said planes of a width less than the diameter of said roller means, said roller bearing means lying within the angle formed by said plates, and said roller means being located and supported by said plates and said roller bearing means to lie with a quadrant of the circumferential surface of said roller means projecting through said slot.

7. A unitary assembly adapted to form the edge of a loading platform and having an outer surface in the form of two perpendicular planes joined by a quadrant of the circumferential surface of a cylinder, said assembly comprising roller means, two plates each tangential at one edge to said circumferential surface, and roller bearing means contacting said roller means throughout substantially the length thereof and forming with said plates a cage axially co-extensive with said roller means.

8. A unitary assembly adapted to form the edge of a loading platform and comprising roller means, two plates each tangential at one edge thereof to said roller means, said plates being in perpendicular planes and defining between said edges a slot through which projects a quadrant of the circumferential surface of said roller means, and roller bearing means opposite said slot and engaging said roller means, said roller bearing means together with said plates being effective to support and locate said roller means against radial loading.

9. A unitary assembly adapted to form the edge of a loading platform and comprising roller means, two plates each tangential at one edge thereof to said roller means, said plates being in perpendicular planes and defining between said edges a slot through which projects a quadrant of the circumferential surface of said roller means, axial locating means engaging the end faces of said roller means, and roller bearing means opposite said slot and engaging said roller means, said roller bearing means together with said plates and said axial locating means being effective to support and locate said roller means against radial loading and axial displacement.

10. A unitary assembly adapted to form the edge of a loading platform and comprising roller means, two plates at right angles to each other and each tangential at one edge thereof to said roller means, roller bearing means contacting said roller means throughout substantially the length thereof, and a plurality of spaced supports for said roller bearing means intermediate the ends thereof, said supports being rigid with said plates.

11. In combination, a loading platform presenting an upper surface and an end surface with a cavity between the adjacent edges of said upper and end surfaces, and roller means located in said cavity, the inner walls defining said cavity embracing said roller means over substantially 270° of the circumferential surface thereof, and the remaining 90° of said circumferential surface of said roller means forming a curved junction of said upper and end surfaces, whereby said upper and end surfaces present a substantially unbroken surface over a rounded edge.

12. In a truck body, in combination, a floor presenting an upper surface, and an end surface with a cavity between the adjacent edges of said upper and end surfaces, and roller means located in said cavity, the inner walls defining said cavity embracing said roller means over substantially 270° of the circumferential surface thereof, and the remaining 90° of said circumferential surface of said roller means forming a curved junction of said upper and end surfaces, whereby said floor and end surface present a substantially unbroken surface over a rounded edge.

13. In a truck floor, in combination, a transverse end member presenting an upper surface, and an end surface with a cavity between the adjacent edges of the upper surface of said transverse end member and said end surface, and roller means located in said cavity, the inner walls defining said cavity embracing said roller means over substantially 270° of the circumferential surface thereof, and the remaining 90° of said circumferential surface of said roller means forming a curved junction of said upper surface of said transverse end member and said end surface, whereby said upper surface of said transverse end member and said end surface present a substantially unbroken surface over a rounded edge.

CLEMENTS SAMUEL ROBERT WALFORD.

REFERENCES CITED

The following references are of record in the file of this patent:

UNITED STATES PATENTS

| Number | Name | Date |
|---|---|---|
| 1,041,319 | McGarry | Oct. 15, 1912 |
| 2,079,790 | Colorigh | May 11, 1937 |
| 2,148,224 | Willis | Feb. 21, 1939 |
| 2,304,028 | Shipman | Dec. 1, 1942 |

FOREIGN PATENTS

| Number | Country | Date |
|---|---|---|
| 495,428 | Great Britain | Nov. 14, 1938 |